Aug. 2, 1938.    P. W. DEMPSEY    2,125,334
GASKET
Filed Nov. 22, 1935    3 Sheets-Sheet 3
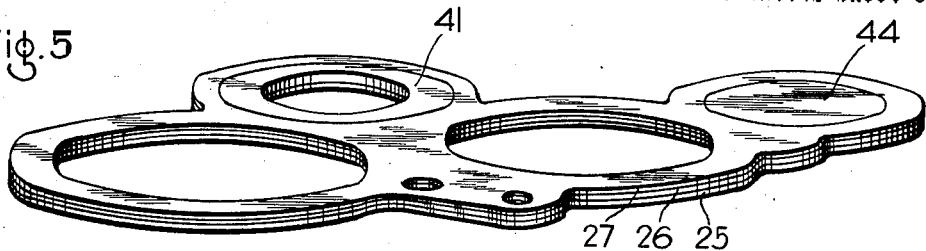
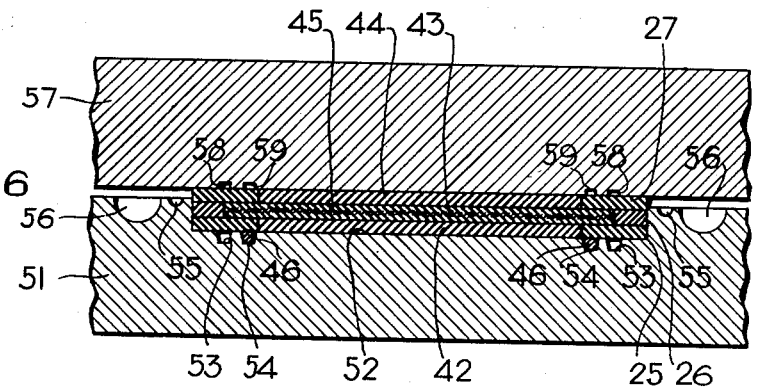
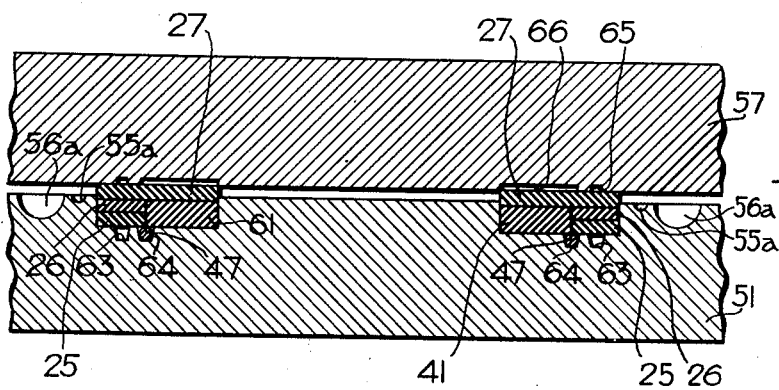
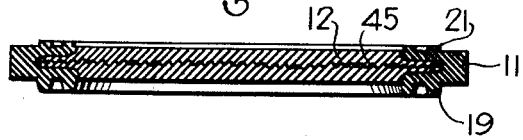
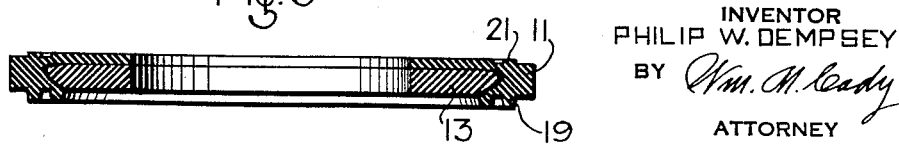
INVENTOR
PHILIP W. DEMPSEY
BY *Wm. M. Cady*
ATTORNEY Patented Aug. 2, 1938

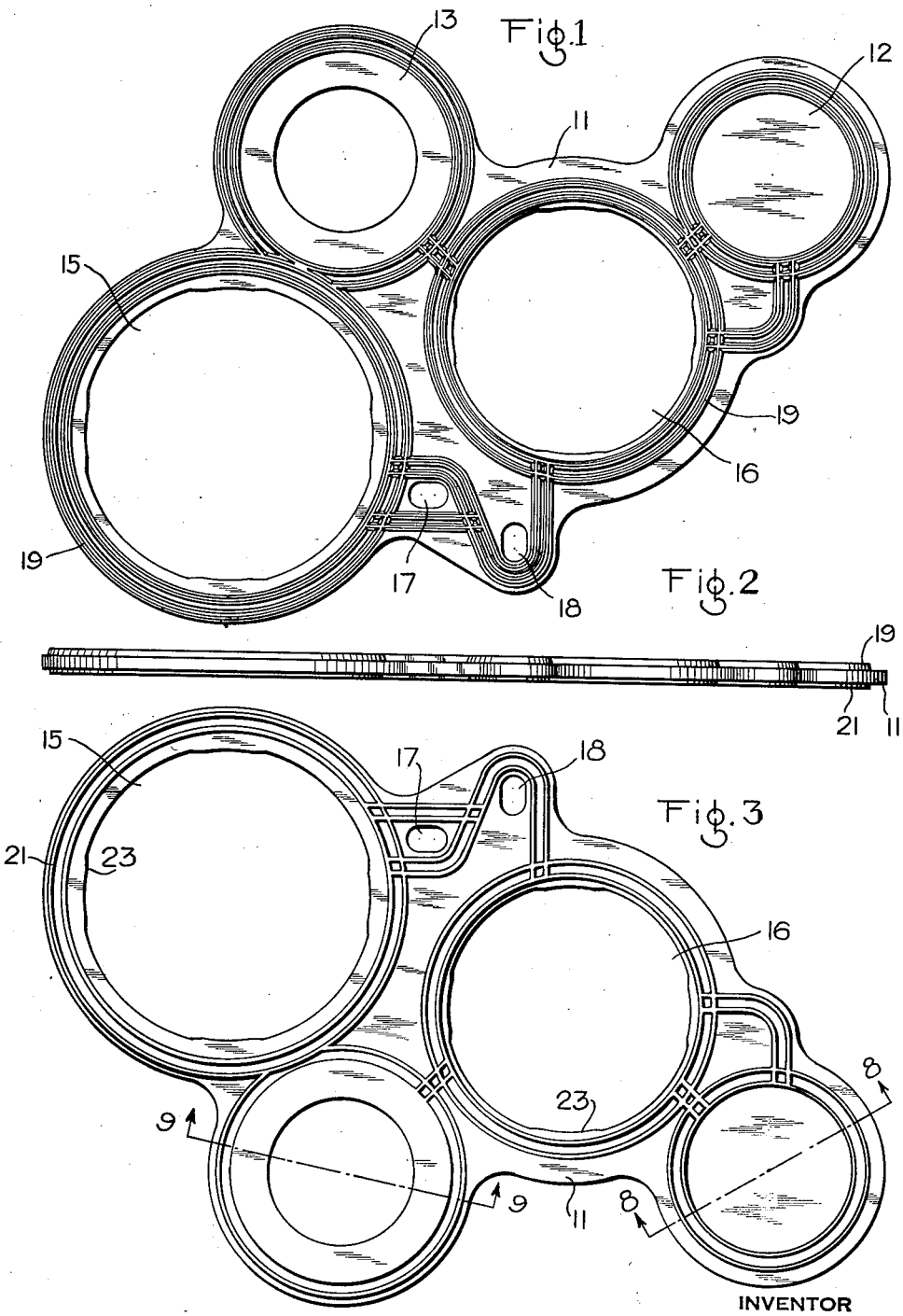

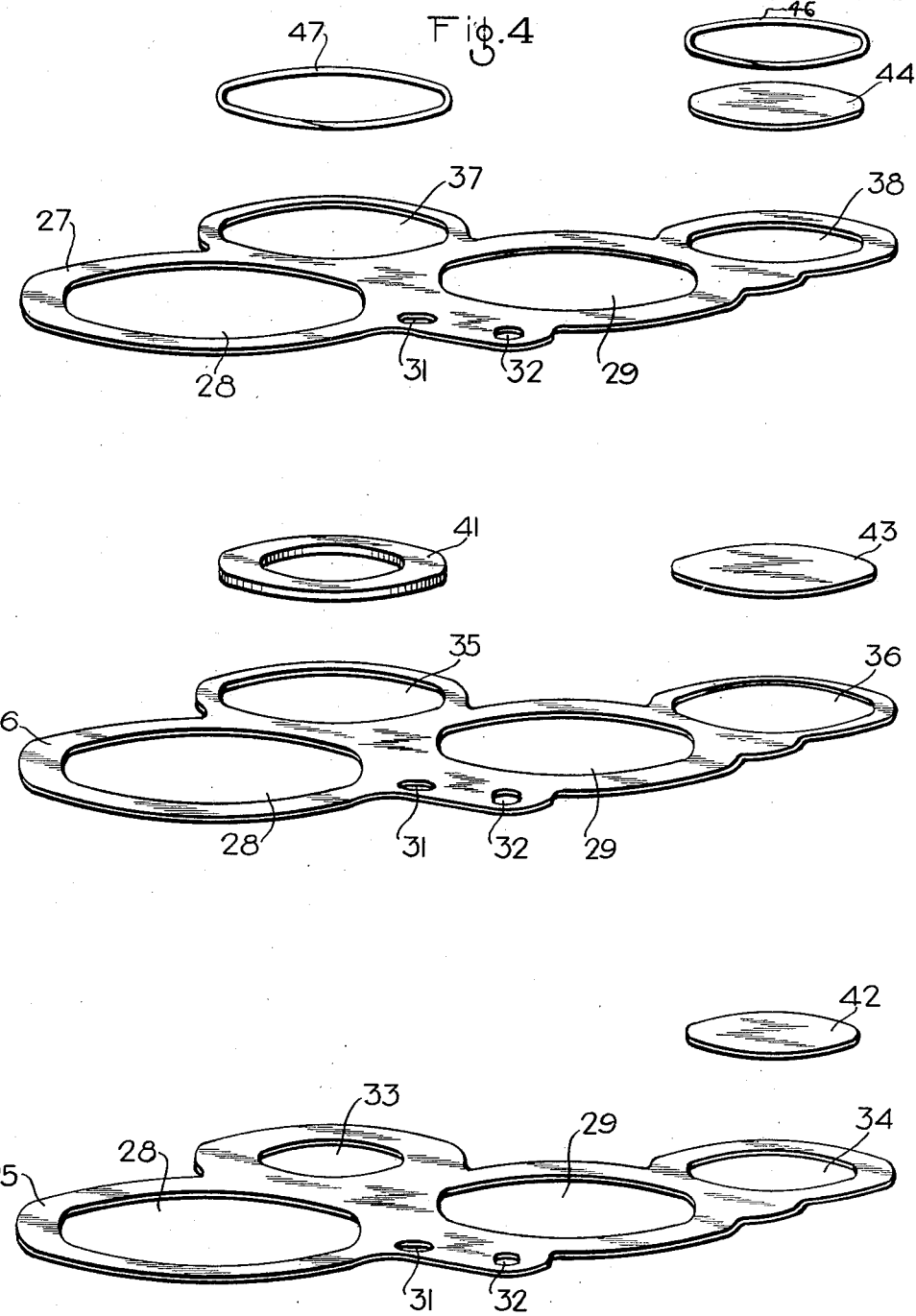

2,125,334

UNITED STATES PATENT OFFICE 2,125,334

GASKET

Philip W. Dempsey, Pittsburgh, Pa., assignor to The Westinghouse Air Brake Company, Wilmerding, Pa., a corporation of Pennsylvania Application November 22, 1935, Serial No. 51,057

3 Claims. (Cl. 137—157)

This invention relates to gaskets, particularly gaskets having different portions of varying degrees of hardness and flexibility.

There is disclosed in Patent 2,055,103 to Ellis E. Hewitt, a composite gasket of rubber material having a diaphragm portion of one degree of hardness and flexibility and a peripheral gasket portion which is relatively harder and less flexible than the diaphragm portion so as to sustain the clamping forces and prevent excessive distortion of the diaphragm portion due to the clamping forces.

The different portions of such a composite gasket must be composed of rubber material of different character so that the desired degree of hardness and flexibility for the different portions results following the molding and vulcanizing operation. It has been found, however, that due to the different portions of the composite gasket being made of rubber material of different character, the several portions of the gasket do not coalesce, that is unite into a unitary mass, under the molding and vulcanizing operation but merely adhere firmly to each other. Under service conditions, the several portions of the composite gasket may separate from each other thereby terminating the effective useful life of the gasket.

It is accordingly an object of my invention to increase the serviceability and life of a composite gasket of the type having portions of rubber material which differ respectively in degree of hardness and flexibility.

More specifically, it is an object of my invention to provide a composite gasket of the type indicated in the foregoing object in which the several parts differing respectively in degree of hardness and flexibility are so constructed and arranged as to be interlocked with each other.

The above and other objects of my invention which will be made apparent hereinafter are attained in a manner which will be subsequently described and which is illustrated in the accompanying drawings, wherein, Fig. 1 is a plan view, showing the appearance of one face of the gasket, Fig. 2 is an elevational view, showing in further detail the construction of the gasket shown in Fig. 1, Fig. 3 is a plan view, showing the appearance of the face of the gasket opposite to that shown in Fig. 1, Fig. 4 is an exploded isometric view, showing the constituent parts of the gasket comprising my invention, prior to assembly, Fig. 5 is an isometric view, showing constituent parts in assembled relation, Fig. 6 is a fragmentary sectional view showing the relation of constituent parts of the gasket in the mold prior to the application of pressure and heat, the section of the gasket corresponding to that indicated by the broken line 8—8 in Fig. 3, Fig. 7 is a fragmentary sectional view, showing the relation of constituent parts of the gasket in the mold prior to application of pressure and heat, the section of the gasket corresponding to that indicated by the broken line 9—9 in Fig. 3, Fig. 8 is a sectional view of the completed gasket, taken on line 8—8 of Fig. 3, and Fig. 9 is a sectional view of the gasket, taken on line 9—9 of Fig. 3.

As will be seen in Figs. 1, 2 and 3, the gasket comprising my invention includes a gasket body portion 11 of suitable material, such as rubber, having a certain hardness and flexibility when vulcanized, a flexible diaphragm portion 12 united to the body portion 11 in a manner hereinafter described and being of material, such as rubber, softer and more flexible than the body portion when vulcanized, and a piston seat portion 13 which is united to the body portion 11 in the manner hereinafter described and which is also of material, such as rubber, softer and more flexible than the body portion 11 when vulcanized.

The body portion 11 has two openings 15 and 16 through which may extend projections on the members between which the gasket is clamped. Additional openings 17 and 18 in the body portion 11 are provided through which bolts may extend for securing the clamping members.

The diaphragm portion 12, the piston seat portion 13, and each of the openings 15, 16, 17 and 18 are each completely surrounded by a pair of spaced sealing ribs 19 which project and taper outwardly from the face of the gasket as shown in Figs. 1 and 2.

The opposite face of the gasket is provided with so-called "phantom" beads or ribs 21 coincident with the ribs 19 but of rectangular cross-section and extending a lesser distance away from the corresponding face of the gasket than do ribs 19, in a manner and for a purpose described and claimed in the copending application Serial No. 738,492, now Patent No. 2,058,010, of Ellery R. Fitch, assigned to the assignee of this application.

The gasket is provided with a plurality of projections 23 extending into the openings 15 and 16 in the manner and for a purpose taught and claimed in the copending application Serial No.

724,080, now Patent No. 2,074,746, of Ellis E. Hewitt, assigned to the assignee of this application.

Further details of construction of the gasket shown in Figs. 1 to 3 will be understood from the following description of the method by which the gasket is made.

Referring particularly to Figs. 4 and 5, it will be seen that the gasket body portion 11 is made up of three layers 25, 26, and 27 of coincident contour, the layers being of substantially the same thickness and of the same material, which material when vulcanized attains the desired degree of hardness and flexibility for the gasket body 11. Each of the layers 25, 26 and 27 has corresponding perforations or openings 28, 29, 31 and 32 therein for providing the necessary openings 15, 16, 17 and 18, respectively, of the completed gasket. The one outer layer 25 also has therein an opening 33 and an opening 34. The intermediate layer 26 has therein two openings 35 and 36 adapted to register coaxially with the openings 33 and 34, respectively, in the layer 25 when the layers 25 and 26 are in coinciding superimposed relation but which are larger in size than the openings 33 and 34 of the layers 25. The outer layer 27 has herein an opening 37, which is the same size as the opening 35 of the layer 26 and which is adapted to register coaxially with the opening 35 of the layer 26 when the layer 27 is superimposed on the layer 26, and an opening 38 corresponding in size to the opening 34 in the layer 25, which opening is adapted to register coaxially with the opening 36 in the layer 26.

The diaphragm portion 12 is made up of three disc-like layers 42, 43 and 44 which correspond respectively in size to and are adapted to fit into the openings 34, 36 and 38 respectively of the several layers 25, 26 and 27. The discs 42 and 44 are constituted wholly of rubber material while the disc 43 has a layer 45 of reinforcing fabric embedded centrally therein, as indicated in Figs. 6 and 8.

The piston seat portion 13 is formed out of an annulus 41, which is substantially twice as thick as the individual layers 25, 26 and 27, and which is composed of material which when vulcanized has the desired degree of softness and flexibility for the piston seat portion 13.

The inner sealing rib 19 surrounding the diaphragm portion 12 and the inner sealing rib 19 surrounding the piston seat portion 13 are formed, respectively, out of two lengths 46 and 47 of extruded rubber material which is the same in character as the rubber material composing the layers 25, 26 and 27. The lengths 46 and 47 of extruded rubber are of relatively small circular cross-section and string-like in appearance, and are adapted to be disposed in circular grooves in the gasket mold in the manner hereinafter described. In order to enable a more ready understanding of the method of manufacture involved, the lengths 46 and 47 of extruded rubber are shown in Fig. 4 as arranged in circular form with ends overlapped, and disposed in the position which they occupy relative to the gasket layers when in the mold.

The constituent parts shown in Fig. 4 are assembled in any suitable manner into the form shown in Fig. 5. For purposes of illustration, the constituent elements or parts of the gasket may be assembled in the following manner: (1) The diaphragm disc 42 is fitted into the opening 34 in the layer 25, (2) the layer 26 is superimposed in coinciding relation on top of the layer 25, (3) the diaphragm disc 43 is fitted into the opening 36 of the central layer 26, (4) the annulus 41 is fitted into the opening 35 of the central layer 26, (5) the layer 27 is superimposed in coinciding relation on top of layer 26 with the annulus 41 extending into the opening 37 and being flush at the upper face thereof with the upper face of the layer 27, and (6) the diaphragm disc 44 is fitted into the opening 38 in the layer 27. The lengths 46 and 47 of extruded rubber are not shown in Fig. 5 inasmuch as the cooperation thereof with the gasket assembly shown in Fig. 5 is effected in the mold in the manner to be subsequently described hereinafter in connection with Figs. 6 and 7.

For simplicity, the mold wherein the gasket is formed and which comprises upper and lower portions is not completely shown in either Fig. 6 or Fig. 7, only those fragments thereof being indicated in Figs. 6 and 7 which are necessary to an understanding of the disposition of the lengths 46 and 47 of extruded rubber relative to the gasket assembly in the mold prior to the vulcanizing operation.

Referring to Figs. 6 and 7, the lower portion 51 of the mold has a recess 52 therein for receiving that portion of the gasket assembly which includes the diaphragm portion 12, the face of the recess 52 having circular grooves 53 and 54 therein which grooves are of such cross-sectional configuration as to form the desired cross-section for the sealing ribs 19.

On the inner face of the mold portion 51 and surrounding the recess 52 are a pair of concentric spaced troughs or grooves 55 and 56 which are adapted to receive the overflow of the gasket material when the gasket is subjected to pressure and heat in the mold, these grooves 55 and 56 being described and claimed in my Patent 1,910,526. On the inner face of the upper portion 57 of the mold opposite the recess 52 of the lower portion 51 are a pair of concentric circular spaced grooves 58 and 59 adapted to form the outer and inner phantom beads 21 indicated in Fig. 3.

As will be seen in Fig. 7, the lower portion 51 of the mold is also provided with an annular recess 61 for receiving therein that part of the gasket assembly shown in Fig. 5 which includes the piston seat portion 13. The surface of the recess 61 has therein a pair of concentric spaced grooves 63 and 64 for forming respectively the outer and inner sealing ribs 19 which surround the piston seat portion 13 shown in Fig. 1. Overflow troughs or grooves 55a and 56a, corresponding to the grooves 55 and 56 and surrounding the recess 61, are also provided on the inner face of the lower portion 51 of the mold. The inner face of the upper portion 57 of the mold has therein a circular groove 65 for forming the outer phantom bead 21 around the piston seat portion 13 and a relatively wide annular groove 66 inwardly concentric to the groove 65 for forming a relatively wide supporting back surface for the piston seat portion 13.

The lengths 46 and 47 of extruded rubber are first disposed in the grooves 54 and 64, respectively, of the lower portion 51 of the mold, and the gasket assembly shown in Fig. 5 is then placed in the mold with the upper face downward, it being understood that the inner face of the lower portion 51 of the mold is provided with a suitable recess, including the recesses 52 and 61, for receiving the entire gasket assembly therein.

After placing the upper portion 57 of the mold in suitable aligned cooperative relation with the lower portion 51 and securing the two portions together in any suitable manner, the mold is then subjected to suitable pressure and heat, it being understood that the inner surfaces of the upper and lower portion of the mold ultimately meet in contacting relation.

The gasket is maintained in the mold under suitable pressure and heat conditions for a suitable length of time necessary to vulcanize and unite the various parts into a unitary structure. Upon removal of the gasket from the mold, any flash or excess material extruded along the peripheral edge of the gasket may be removed in any suitable manner, as by buffing, in order to provide smooth peripheral edges for the gasket.

In the completed gasket, as shown in the sectional views of Figs. 8 and 9, it will be noted that the three gasket layers 25, 26 and 27 and the lengths 46 and 47 of extruded rubber become integrally united under the vulcanizing process as do also the three diaphragm discs 42, 43 and 44. It will be further noted by a comparison of Figs. 6 and 7 relative to Figs. 8 and 9, respectively, that the total thickness of the three diaphragm discs 42, 43 and 44, prior to the application of pressure and heat is greater than the thickness of the diaphragm portion 12 in the completed gasket, and that the thickness of the annulus 41 prior to the application of pressure and heat is slightly greater than that of the piston seat portion 13 in the completed gasket. It should therefore be understood that the material of the diaphragm discs 42, 43 and 44 and of the annulus 41 flows radially outward under the pressure and heat conditions while in the mold.

According to my invention, I provide the lengths 46 and 47 of extruded rubber and initially dispose them in the grooves 54 and 64 of the mold, in order to prevent the relatively soft rubber material of the diaphragm discs 42, 43, and 44 and of the annulus 41 from flowing into the sealing rib grooves 54 and 64 of the mold under pressure and heat conditions and thereby causing the inner sealing rib 19 surrounding the diaphragm portion 12 and the inner sealing rib 19 surrounding the piston seat portion 13 to be of relatively soft rubber instead of relatively hard rubber. Furthermore, by providing the lengths 46 and 47 of extruded rubber in the grooves 54 and 64 of the mold, the line of demarcation between the relatively hard rubber material of the body portion 11 and the relatively soft rubber material of the diaphragm portion 12 and the piston seat portion 13 is uniformly determined. This is of particular importance in connection with the diaphragm portion 12, in order to obtain uniform diaphragm characteristics.

It will be noted, additionally, in Figs. 8 and 9 that the periphery of the diaphragm portion 12 as well as the periphery of the annulus 41 is overlapped on both sides by the gasket body portion 11 and, therefore, that the diaphragm portion 12 and the piston seat portion 13 are interlockingly embedded in the gasket body portion 11, thereby preventing possible severance or separation of the diaphragm portion 12 and the piston seat portion 13 from the gasket body portion 11.

Furthermore, in view of the fact that the sealing ribs 19 and the phantom ribs 21 are on the part of the gasket body portion 11 which overlaps the priphery of the diaphragm portion 12 and the piston seat portion 13, it will be seen that when the gasket is confined between two clamping members on opposite sides thereof, the clamping force presses the sealing ribs 19 and 21, which are relatively hard, into the periphery of the diaphragm portion 12 and piston seat portion 13, which are relatively soft, and this further serves to prevent severance or separation of the diaphragm portion 12 and piston seat portion 13 from the gasket body portion 11.

While I have disclosed a principle of construction and a method of manufacture as applied to a specific type of gasket, it should be understood that both the principle of construction and the method of manufacture disclosed herein may be employed in the construction and manufacture of other types and configurations of gaskets. It is not my intention therefore to limit the scope of my invention except as necessitated by the prior art and as defined in the appended article claims and the process claims of my copending divisional application Serial No. 207,497, filed May 12, 1938.

Having now described my invention, what I claim as new and desire to secure by Letters Patent, is:

1. A composite gasket comprising a portion of relatively soft flexible rubber and a portion of relatively hard and less flexible rubber than that of the soft flexible portion surrounding the periphery of and overlapping on both sides the peripheral section of the soft flexible portion.

2. A combined gasket and diaphragm comprising a diaphragm portion of relatively soft flexible rubber, and a gasket portion of rubber which is harder and less flexible than that of the diaphragm portion, surrounding the periphery of and overlapping on both sides the peripheral section of the diaphragm portion, both sides of the diaphragm portion being exposed at the inner area thereof.

3. A composite gasket and diaphragm comprising a diaphragm portion of relatively soft flexible rubber, a gasket portion of rubber harder and less flexible than that of the diaphragm portion, surrounding the periphery of and overlapping the peripheral section of the diaphragm portion on both sides, a sealing rib of the same material as the gasket portion integrally formed on one overlapping side of the gasket portion, and another rib of the same material as the gasket portion formed on the other overlapping side of the gasket portion in alignment with the said sealing rib, said ribs being effective when subject to clamping force to effect gripping of the peripheral section of the diaphragm portion along a line spaced inwardly from the outer periphery of the diaphragm portion and thereby assist in preventing separation of the diaphragm portion from the gasket portion.

PHILIP W. DEMPSEY.